United States Patent
Cruey

(10) Patent No.: US 6,546,840 B1
(45) Date of Patent: Apr. 15, 2003

(54) LINEARLY RECIPROCATING PNEUMATIC PISTON

(76) Inventor: Jim O. Cruey, Rt. 1, Box 1324, Pounding Mill, VA (US) 24637

( * ) Notice: Subject to any disclaimer, the term of this patent is extended or adjusted under 35 U.S.C. 154(b) by 0 days.

(21) Appl. No.: 09/998,891

(22) Filed: Nov. 27, 2001

(51) Int. Cl.[7] .................................................. F01B 7/20

(52) U.S. Cl. ...................... 92/51; 92/66; 92/75; 91/173

(58) Field of Search .......................... 91/169, 173, 176; 92/51, 52, 66, 75

(56) References Cited

U.S. PATENT DOCUMENTS 3,618,474 A * 11/1971 Ward .............................. 92/66

* cited by examiner

*Primary Examiner*—F. Daniel Lopez
(74) *Attorney, Agent, or Firm*—John D. Gugliotta; Olen L. York, III; P. Jeff Martin

(57) ABSTRACT

A mechanical pneumatic piston is comprised of an upper cylindrical section and a lower cylindrical section, wherein each section has four linearly elongated, miter-cut staves, an end sleeve, and a slide-guide ring. The mechanical pneumatic piston is further defined as having an internal upper, central, and lower cavity adjacently aligned and extending axially within the piston.

6 Claims, 3 Drawing Sheets

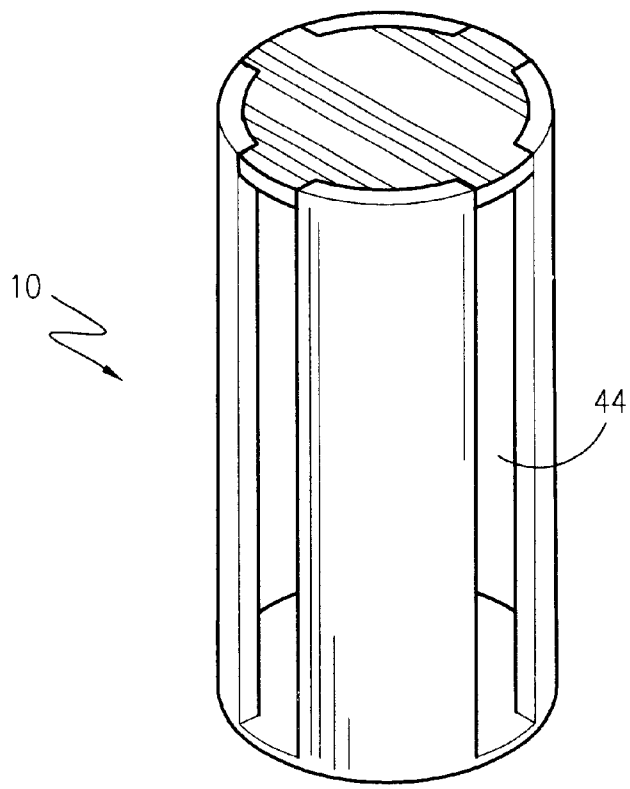
*Figure 2*
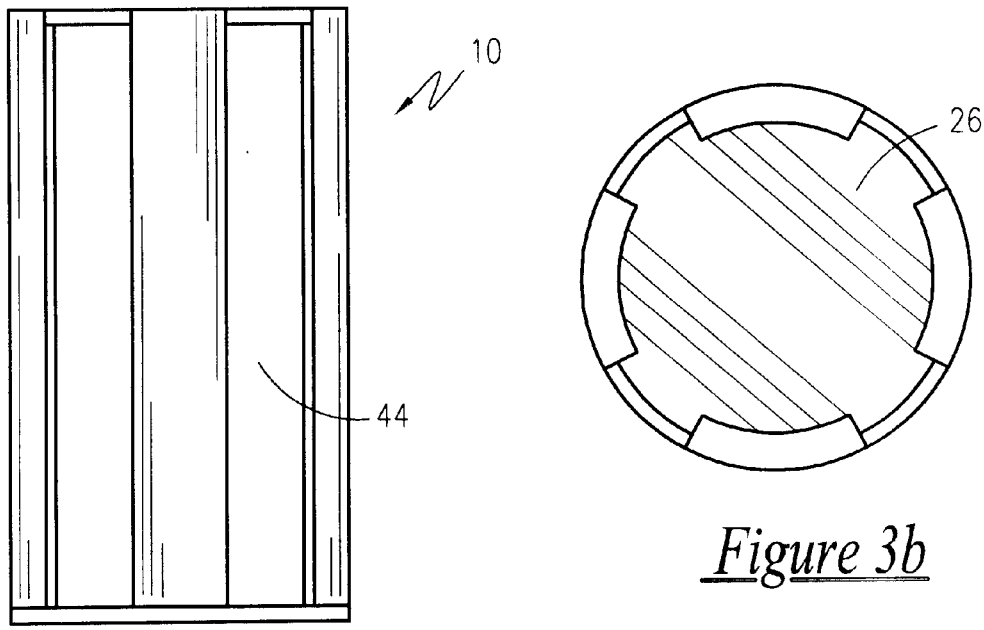
*Figure 3a*  *Figure 3b*

LINEARLY RECIPROCATING PNEUMATIC PISTON

RELATED APPLICATIONS

There are no previously filed, nor currently any co-pending applications, anywhere in the world.

BACKGROUND OF THE INVENTION

1. Field of the Invention

The present invention relates generally to pistons and, more particularly, to a mechanical pneumatic piston.

2. Description of the Related Art

On many occasions and in various walks of life, many people are faced with various problems around the home, in the garage, during recreation, or even on the job which require one to obtain precise height and/or length measurements in order to perform the task at hand. Such problem is a common occurrence met by one when hanging curtains, car jacking, surveying land, operating stamping machines, leveling a camper, or the like. All of the aforementioned and similarly related problems could be eliminated with a telescopically adjustable device.

Consequently, a need has been felt for providing a telescopically adjustable device which remedies problematic applications requiring precise height and/or length measurements in a manner which is quick, easy, and efficient.

SUMMARY OF THE INVENTION

Therefore, it is an object of the present invention to provide a mechanical pneumatic piston having an upper cylindrical section opposing a lower cylindrical section.

It is another object of the present invention to provide a mechanical pneumatic piston having a plurality of slide-guide rings which interlock the upper cylindrical section to the lower cylindrical section.

It is another object of the present invention to provide a mechanical pneumatic piston having a plurality linearly elongated, miter-cut staves.

It is another object of the present invention to provide a mechanical pneumatic piston having opposing end sleeves.

It is another object of the present invention to provide a mechanical pneumatic piston having a plurality of entry-portals through which air is injected so as to actuate reciprocation by the staves within the opposing end sleeves.

It is still another object of the present invention to provide a mechanical pneumatic piston having an internal upper cavity, an internal central cavity, and an internal lower cavity.

It is still another object of the present invention to provide a mechanical pneumatic piston which affords a multitude of useful applications.

Briefly described according to one embodiment of the present invention, a mechanical pneumatic piston is comprised of an upper cylindrical section and a lower cylindrical section, wherein each section has four linearly elongated, miter-cut staves, an end sleeve, and a slide-guide ring.

The mechanical pneumatic piston is further defined as having an internal upper, central, and lower cavity adjacently aligned and extending axially within the piston.

The slide-guide rings interlock the upper cylindrical section to the lower cylindrical section. Each end sleeve serves to couple the staves of each cylindrical section, thereby effectively enclosing the upper and lower cavities.

Air injected into the internal central cavity via an entry portal projecting perpendicularly from a circumferential sidewall of a stave actuates reciprocation of the mechanical pneumatic piston to a retracting position. Air injected into the upper cylindrical section via entry portal projecting from a sidewall of an upper cylindrical section or, alternatively, into the lower cylindrical section, actuates reciprocation of the mechanical pneumatic piston to a protracting position. Thus, air injected within an internal cavity via the entry portal actuates reciprocation by the staves within each end sleeve.

The mechanical pneumatic piston affords a multitude of useful applications including but not limited to adjustable curtain rods; tripod legs; spring-loaded shower curtain rods; adjustable table legs; adjustable braces; clamping devices such as vices whereby inverted jaws of a vice are attached to opposing sections of the mechanical pneumatic piston being operable via air injection; adjustable bars for table saw extensions; elevation rods utilized by surveyors; adjustable suspension rods and shocks for automobiles; hanging scales; air jacks and manually-operated pumping jacks; adjustable jack stands; and stamping machines using cutting dies.

The mechanical pneumatic piston is fabricated from a member selected from the group consisting of wood, plastic, aluminum, steel, and iron, and wherein the chosen fabrication material being directly dependent upon piston's intended use or application.

It is envisioned that an alternate embodiment of the present invention is comprised of an upper cylindrical section and a lower cylindrical section, wherein each section has 2–3 linearly elongated, miter-cut staves.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a perspective view thereof;

FIG. 3a is a side elevational view thereof;

FIG. 3b is a top plan view thereof;

FIG. 4b is a top plan view of the second piston shaft (14) of FIG. 4a.

DESCRIPTION OF THE PREFERRED EMBODIMENTS

Figure 1:
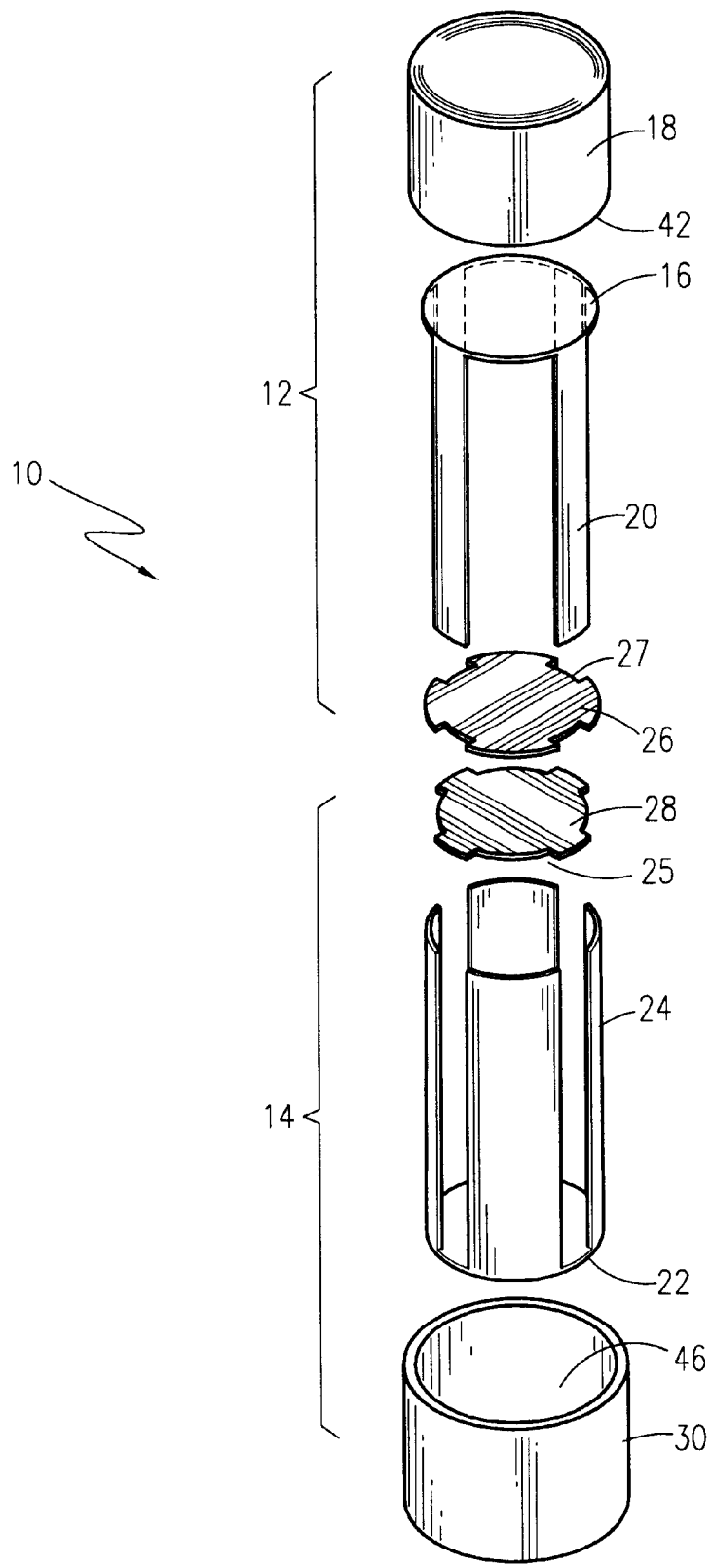
FIG. 1 is an exploded perspective view of a concentric reciprocating pneumatic piston according to the preferred embodiment of the present invention.

The best mode for carrying out the invention is presented in terms of its preferred embodiment, herein depicted within the Figures.

1. Detailed Description of the Figures

Referring now to FIG. 1–FIG. 3b, a linearly reciprocating piston apparatus 10 is shown, according to the present invention, consisting of a first piston shaft 12 linearly aligned along its vertical centerline with a second piston shaft 14. The first piston shaft 12 is formed of a first end plate 16 having a plurality of perpendicularly attached, downwardly extending, linearly elongated upper stave extensions 20. The second piston shaft 14 is made in a similar manner, having a second end plate 22 having plurality of perpendicularly attached, downwardly extending, linearly elongated lower stave extensions 24.

As shown in the figures, the number of upper stave extensions 20 matches that of the lower stave extensions 24, and such upper and lower stave extensions are spaced such as to allow alternate passage of an upper stave 20 between two lower staves 24 and a lower stave 24 between two upper staves 20.

A first blocking plate 26 connects the lower ends of the upper staves 20 while providing a pattern of passage notches 27 for interfitting with the aligned and passing lower staves 24. Similarly, a second blocking plate 28 connects the upper ends of the lower staves 24 while providing a pattern of passage notches 29 for interfitting with the aligned and passing upper staves 20.

A first end cap 18 fits down over the first end plate 16 and circumscribes the upper end of the upper stave extensions 20. A second end cap 30 fits down over the second end plate 22 and circumscribes the lower end of the lower stave extensions 24.

Figure 4A:
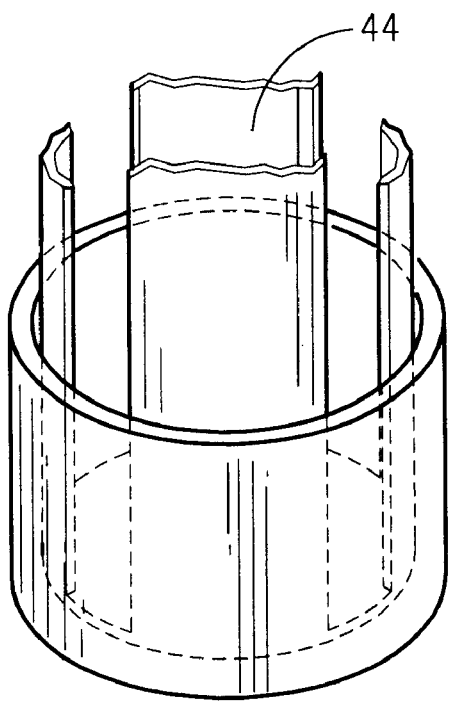
FIG. 4a is a partial perspective view of a second piston shaft (14) for use with the present invention.
Figure 4B:
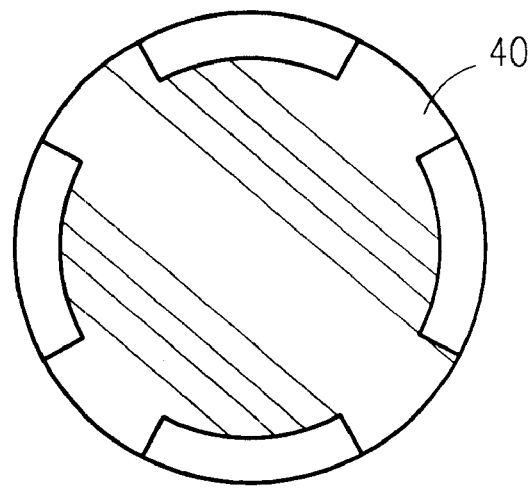

Referring to FIGS. 4a–4b, the radially symmetric nature of each piston shaft 12, 14 is shown and described, showing the notched outer perimeter of the blocking plates 28 to form a stave receiving recess, alternating with the stave blocking/attachment detente 40. These interlocking and interrelating piston shafts thereby define an internal upper cavity 42, central cavity 44, and lower cavity 46 adjacently aligned and extending axially within the piston. Each end sleeve serves to couple the staves of each cylindrical section, thereby effectively enclosing the upper and lower cavities.

2. Operation of the Preferred Embodiment

To use the present invention in accordance with a preferred embodiment, as shown in FIG. 2, air injected into the internal central cavity via an entry portal projecting perpendicularly from a circumferential sidewall of a stave actuates reciprocation of the mechanical pneumatic piston to a retracting position. Air injected into the upper cylindrical section via entry portal projecting from a sidewall of an upper cylindrical section or, alternatively, into the lower cylindrical section, actuates reciprocation of the mechanical pneumatic piston to a protracting position. Thus, air injected within an internal cavity via the entry portal actuates reciprocation by the staves within each end sleeve.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. By way of example, and not as a limitation, a mechanical pneumatic piston affords a multitude of useful applications including but not limited to adjustable curtain rods; tripod legs; spring-loaded shower curtain rods; adjustable table legs; adjustable braces; clamping devices such as vices whereby inverted jaws of a vice are attached to opposing sections of the mechanical pneumatic piston being operable via air injection; adjustable bars for table saw extensions; elevation rods utilized by surveyors; adjustable suspension rods and shocks for automobiles; hanging scales; air jacks and manually operated pumping jacks; adjustable jack stands; and stamping machines using cutting dies.

It is further envisioned that alternate embodiment of the present invention is comprised of an upper cylindrical section and a lower cylindrical section, wherein each section has 2–3 linearly elongated, miter-cut staves. The presently described best mode embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A linearly reciprocating piston apparatus comprising:
   a first piston shaft formed of a first end plate having a plurality of perpendicularly attached, downwardly extending, linearly elongated upper stave extensions;
   a second piston shaft linearly aligned along its vertical centerline with said first piston shaft, said second piston shaft formed of a second end plate having plurality of perpendicularly attached, downwardly extending, linearly elongated lower stave extensions;
   a first blocking plate connecting lower ends of said upper staves while providing a pattern of passage notches for interfitting with the aligned and passing lower staves;
   a second blocking plate connecting upper ends of said lower staves while providing a pattern of passage notches for interfitting with the aligned and passing upper staves;
   a first end cap fitting over said first end plate and circumscribing the upper end of said upper stave extensions;
   a second end cap fitting over said second end plate and circumscribing the lower end of the lower stave extensions; and
   wherein the number of upper stave extensions matched the number of the lower stave extensions, said upper stave extension and lower stave extensions being spaced such as to allow alternate passage of an upper stave between two lower staves and a lower stave between two upper staves.

2. The linearly reciprocating piston apparatus of claim 1, wherein said first piston shaft and said second piston shaft are each radially symmetric, wherein the interlocking and interrelating piston shafts thereby define an internal upper cavity, a central cavity, and a lower cavity adjacently aligned and extending axially within the piston.

3. The linearly reciprocating piston apparatus of claim 2, wherein application of a driving fluid in said internal lower cavity drives said lower piston shaft downward relative to said upper piston shaft.

4. The linearly reciprocating piston apparatus of claim 2, wherein application of a driving fluid in said internal upper cavity drives said upper piston shaft upward relative to said lower piston shaft.

5. The linearly reciprocating piston apparatus of claim 2, wherein application of a driving fluid in said central cavity drives said upper piston shaft and said lower piston shaft together relative to each other aid upper piston shaft.

6. The linearly reciprocating piston apparatus of claim 1, wherein said first blocking plate and said second blocking plate each have a notched outer perimeter to form a stave receiving recess alternating with stave blocking/attachment detente.

* * * * *